United States Patent [19]

Herron

[11] Patent Number: 5,417,541
[45] Date of Patent: May 23, 1995

[54] MANUAL FORKLIFT PALLET JACK FOR UNLOADING THE CONTENTS OF A BEVERAGE DELIVERY TRUCK

[76] Inventor: Gregg Herron, 4250 Werth Rd., Alpena, Mich. 49707

[21] Appl. No.: 213,552

[22] Filed: Mar. 16, 1994

[51] Int. Cl.$^6$ .............................................. B60P 1/16
[52] U.S. Cl. ................................. 414/592; 414/346; 414/467; 414/786
[58] Field of Search ............... 414/467, 786, 631–636, 414/345–347, 343, 592; 280/43.12

[56] References Cited

U.S. PATENT DOCUMENTS

| | | | |
|---|---|---|---|
| 2,623,653 | 12/1952 | Framhein | 280/43.12 X |
| 2,869,744 | 1/1959 | Kagel | 414/634 |
| 2,943,755 | 7/1960 | Bryntse | 414/634 |
| 3,799,379 | 3/1974 | Grether et al. | 414/467 |
| 3,826,393 | 7/1974 | Carroll | 414/632 |
| 4,061,237 | 12/1977 | Austin et al. | 414/467 |
| 4,340,235 | 7/1982 | Thompson | 414/634 X |
| 4,392,541 | 7/1983 | Barchard | 280/43.12 X |
| 4,435,113 | 3/1984 | Moseley et al. | 414/347 |
| 4,460,064 | 7/1984 | Lutz et al. | 414/467 X |
| 4,571,139 | 2/1986 | Moseley et al. | 414/347 |
| 4,613,272 | 9/1986 | vom Braucke et al. | 414/347 |

FOREIGN PATENT DOCUMENTS

| | | | |
|---|---|---|---|
| 34395 | 8/1981 | European Pat. Off. | 414/631 |
| 1041865 | 10/1958 | Germany | 414/634 |
| 2110171 | 6/1983 | United Kingdom | 414/347 |

OTHER PUBLICATIONS

Crown Condensed Catalog (6 pp.) #SF-4300 Rev Sep. 1991.
C & H Catalog—(9 pp.), May/Aug. 1994 Buyers Guide
Teledyne Princeton catalog (7 pgs) "Pigmy Power Lifter".

*Primary Examiner*—David A. Bucci
*Attorney, Agent, or Firm*—Learman & McCulloch

[57] ABSTRACT

Freight handling apparatus for unloading stacks of beverage containers supported on pallets within bay wells of a beverage delivery truck having floors tilted inwardly and downwardly toward the center of the truck includes a wheeled frame having an upstanding mast on which a vertically movable carriage is supported mounting a pair of forwardly projecting lifting forks engageable with the pallet load. A hydraulic lifting jack is operable for raising and lowering the forks. A hydraulic tilting jack acts between a set of rear wheels and the back of the frame for selectively elevating the back of the frame relative to the front so as to angle the fork tines downwardly from horizontal to correspond in inclination to that of the floor of the bay wells. The downward angling of the fork tines enables them to be inserted into the correspondingly angled pallet load, and the forks thereafter elevated to lift the pallet load for subsequent removal from the bay well. The apparatus also has a self-stowing feature wherein the fork tines are insertable into suitable hangers mounted to the undercarriage of the truck and the lifting cylinder being double acting for lifting the frame into engagement with the truck undercarriage for transport by the truck when not in use.

11 Claims, 3 Drawing Sheets

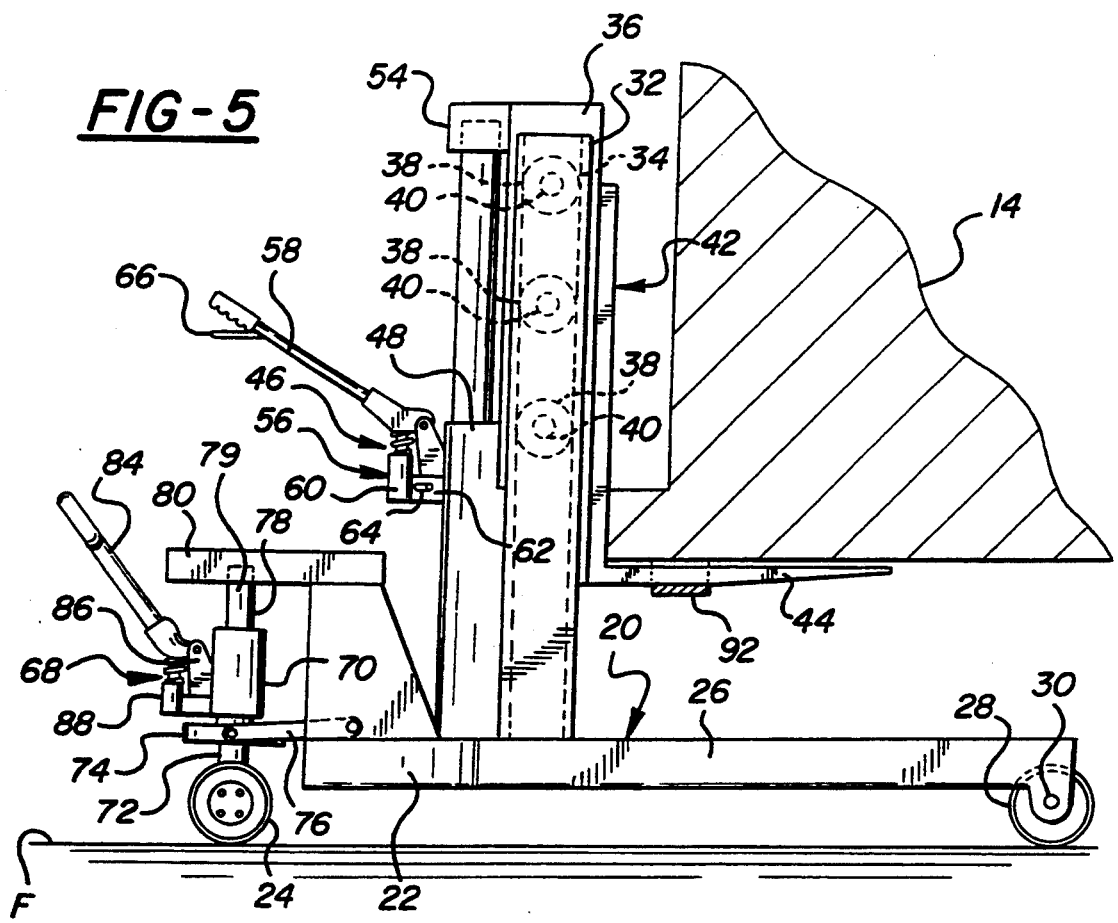
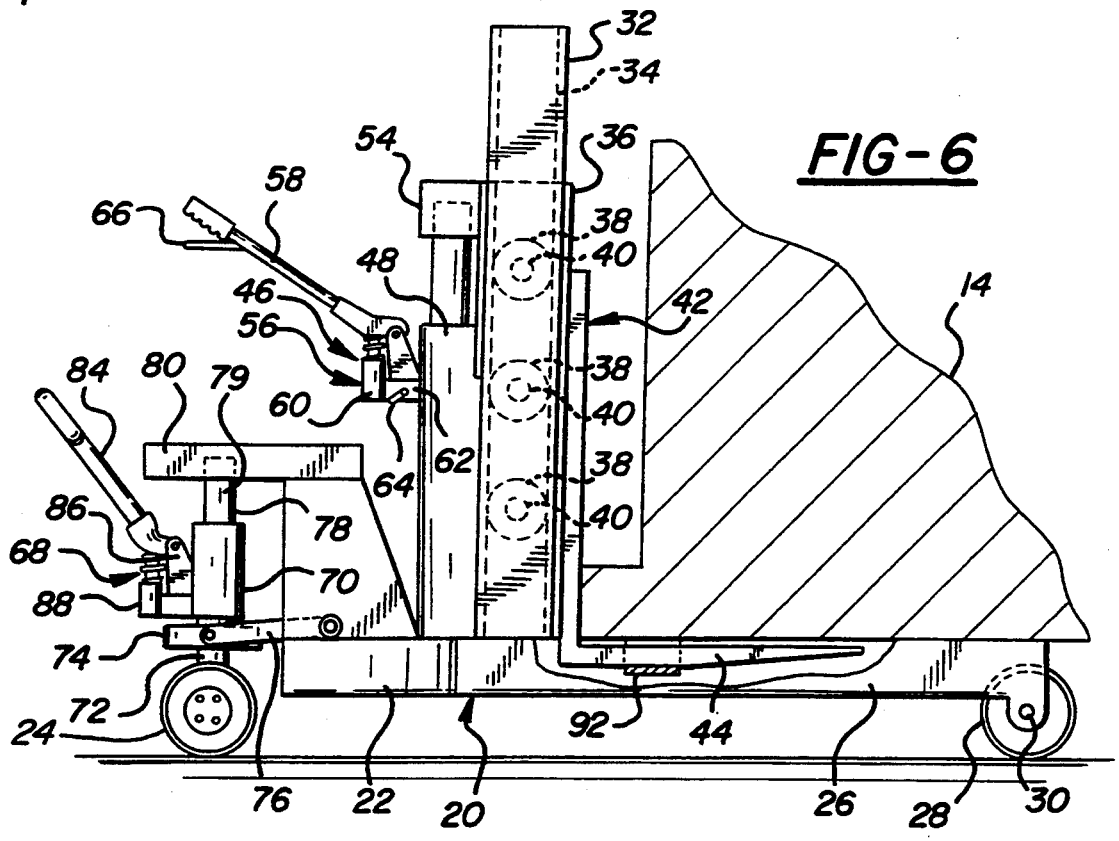

MANUAL FORKLIFT PALLET JACK FOR UNLOADING THE CONTENTS OF A BEVERAGE DELIVERY TRUCK

This invention relates generally to forklift devices and more particularly to manually operable forklift pallet jack apparatus and method for unloading the palleted contents from the slanted bay wells of a beverage delivery truck.

BACKGROUND OF THE INVENTION

Forklifts of various configurations are known for use in loading and unloading palleted freight supported on an elevated floor of a delivery truck. Such forklift devices typically are comprised of a frame having an upstanding mast secured to the frame and supporting a lifting carriage on which a pair of forks are mounted having forwardly projecting horizontal tines. A hydraulic pump or other suitable device enables the carriage and fork assembly to be raised and lowered relative to the frame. The forks of manually operated forklift devices are fixed and thus are generally unsuited for the task of unloading the palleted contents from bays of a side-loading beverage delivery truck, since the bay floors and thus the pallet loads are tilted inwardly and downwardly toward the center of the truck. Some large motorized forklift vehicles have forks that tilt on the mast but are costly, bulky and heavy and would be difficult to haul around on the beverage truck. Consequently, the typical practice still today is to manually unload the stacks of beverage containers from the truck, which is both laborious and time consuming.

SUMMARY OF THE INVENTION

Freight handling forklift apparatus for unloading pallet loads supported at an angle within bay wells of a side-loading beverage delivery truck on floors tilted inwardly and downwardly toward the center of the truck, comprises a rigid frame having a front end, a back end, and support wheels mounted on the frame for transporting the apparatus. An upright mast is secured to the frame and supports a lifting carriage movable therealong between raised and lowered positions. The lifting carriage mounts a pair of lifting forks having forwardly projecting tines for engaging and supporting a pallet load. A carriage lifting device is carried by the frame and coupled to the lifting carriage for selectively moving the carriage and forks on the mast between the raised and lowered positions. A fork tilting device is coupled to the frame for normally supporting the frame in a load transporting position and is operative for selectively elevating the back of the frame relative to the front to thereby tilt the fork tines from the load transporting position downwardly from horizontal to a load receiving position that corresponds in angularity to that of the bay well floor, so as to enable the fork tines to be extended into the pallet load for subsequent lifting and removal by the apparatus.

According to another aspect of the invention, a method of unloading such angled pallet loads from a bay well of a side-loading beverage delivery truck utilizing the aforementioned forklift apparatus comprises the steps of raising the carriage and fork assembly to the level of the pallet load, elevating the back end of the frame relative to the front to thereby tilt the fork tines from an initial load transporting position downwardly from horizontal to a load receiving position corresponding in angularity to that of the bay well floor, moving the wheeled frame toward the truck to insert the downwardly angled fork tines into the pallet load. The carriage and fork assembly is then further raised to lift and support the pallet load off the bay well floor and the back end of the frame lowered to restore the fork tines to the load transporting position. The wheeled frame is then moved away from the truck to withdraw the pallet load from the bay well and the carriage and fork assembly lowered to deposit the pallet load on a support surface.

This invention provides an inexpensive, simply constructed, easily usable and transportable apparatus and method for unloading and transporting the palleted contents from the slanted bay wells of a side-loading beverage delivery truck, obviating the need to manually unload such freight with a recognized labor and cost savings to the user.

THE DRAWINGS

Other objects and advantages of the invention will become apparent with reference to the accompanying drawings and descriptive matter wherein:

FIG. 5 is a side elevational view of the apparatus like FIG. 1, but with the forks elevated and the tines inserted into associated hanger brackets of the truck; and FIG. 6 is a side elevational view like FIG. 5, but illustrating the apparatus in the stowed position.

DETAILED DESCRIPTION

Figure 1:
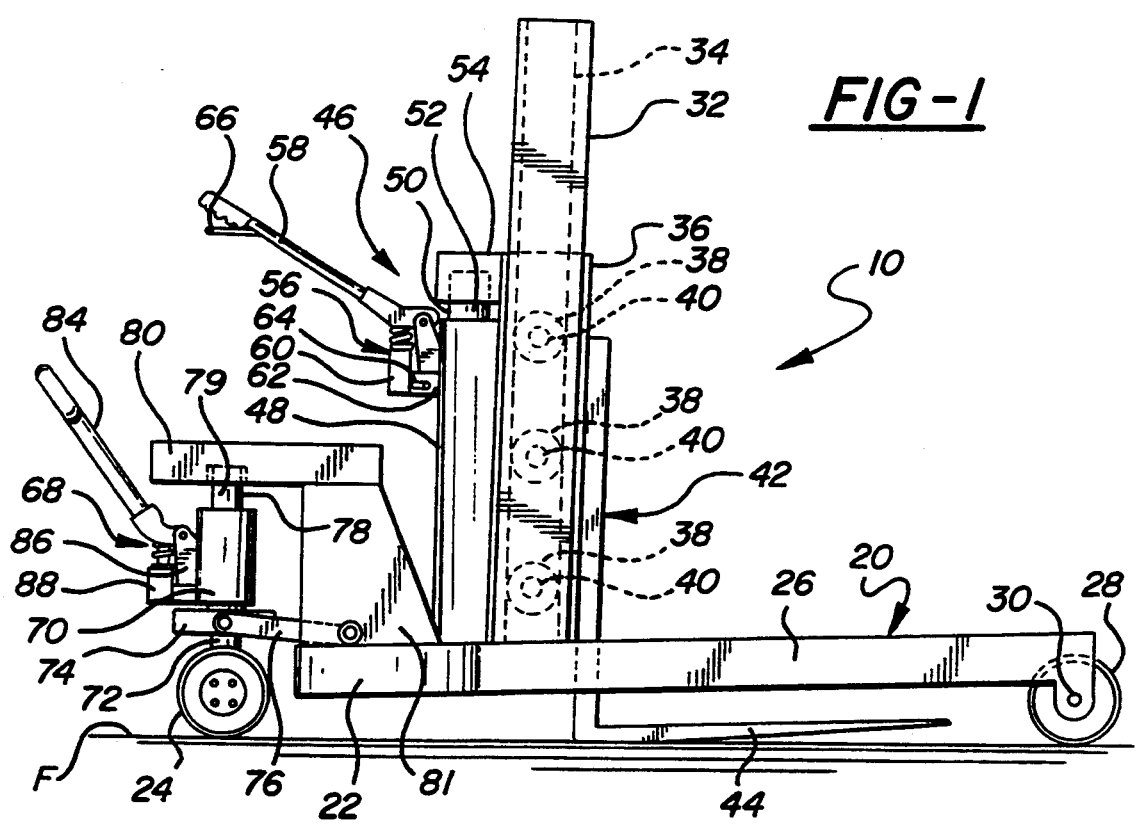
FIG. 1 is a side elevational view of the apparatus shown with the forks lowered and the frame tilted rearwardly in the load transporting position.

Freight handling forklift apparatus, constructed according to a presently preferred embodiment of the invention, is designated generally by the reference numeral 10, and comprises a hand truck device illustrated as adapted for use in unloading and transporting a stack of beverage containers C supported on a pallet P within a bay well 12 of a conventional side-loading beverage delivery truck 14. In the typical beverage delivery truck 14, there are a number of such bay wells or bays, each of which has a floor 16 that is inclined inwardly and downwardly toward the center of the truck at about a 10° angle to purposely tilt the stack of palleted containers C toward the center of the truck and against a back wall 18 of the bays to stabilize the pallet load and keep it from shifting during transport or from falling out when the bay compartment is opened.

The hand truck 10 has a rigid support carriage or frame 20 of generally U-shaped configuration. A main base portion 22 is provided toward the back of the frame 20 and is operably coupled and supported above a floor surface F by dual steerable rear wheels 24. A pair of laterally spaced leg portions 26 are formed integrally with or are otherwise securely mounted to the base portion 22 and extend forwardly to respective free front ends, each of which mounts a front wheel 28 on a fixed axle 30 to support the front of the frame a fixed distance above the floor F.

An upstanding lifting mast is provided by a pair of laterally spaced rigid guide rails 32 which are welded or otherwise fixably secured to the base portion 22 of the frame 20 at their lower ends and project perpendicularly upwardly therefrom in generally vertical fashion to upper free ends spaced above the base portion 22. Extending along the length of each of the rails 32 is an internal channel or guide way 34. The rails 32 movably support a vertically slideable lifting carriage 36 having opposite lateral sides to which a plurality of vertically aligned guide wheels 38 are mounted by axles 40 for rolling accommodation within the channels 34 of rails 32 along the length of the rails 32. As illustrated, there are preferably at least three of such wheels 38 provided on each side of the carriage 36.

A pair of laterally spaced, L-shaped lifting forks 42 are mounted on the carriage 36 for movement therewith. The forks 42 have tine portions 44 rigidly secured to the carriage 36 and projecting forwardly in generally parallel relation to the leg portions 26 of the frame to distal free ends adjacent the front of the frame. The tines 44 are fixed angularly relative to the frame 20 such that the angular relation between the fork tines 44 and frame 20 remains constant. As shown best in FIG. 2, the fork tines 44 are straddled by the leg portions 26 of the frame 20 enabling the fork tines 44 to be lowered to the floor F, as illustrated in FIG. 1, without interference by the leg portions 26.

Figure 2:
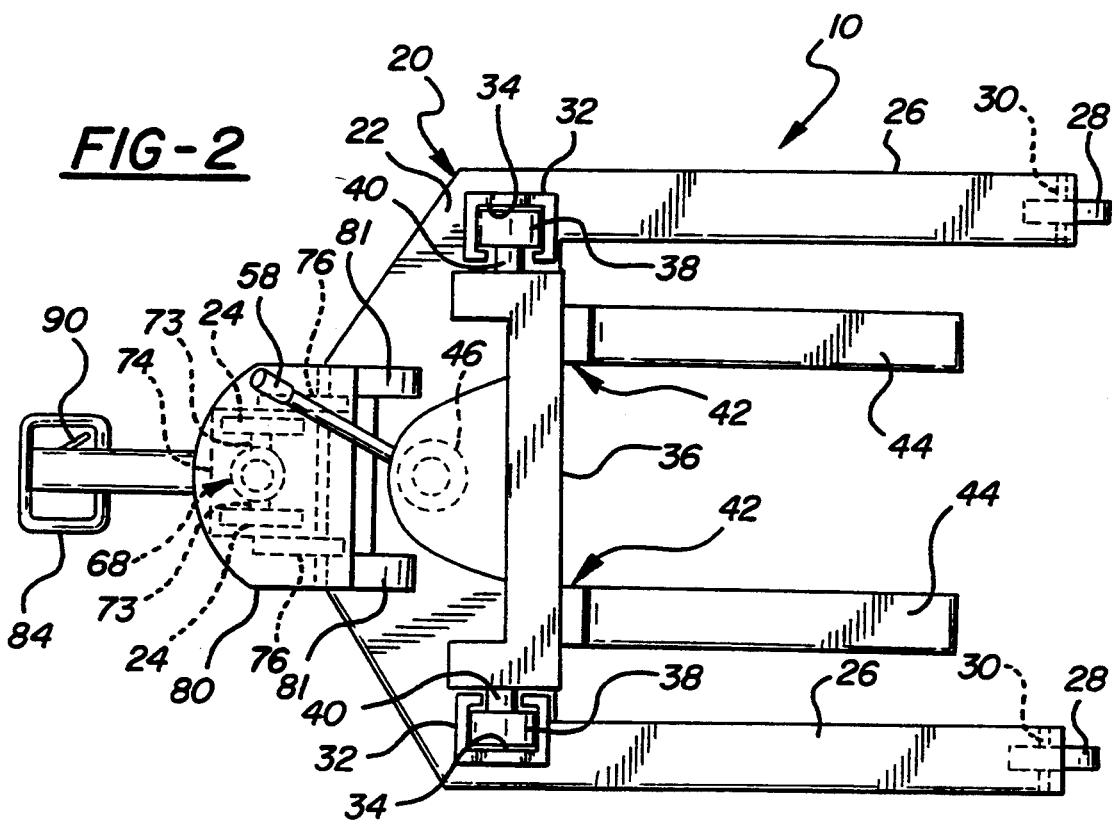
FIG. 2 is a top view of the apparatus of FIG. 1.
Figure 3:
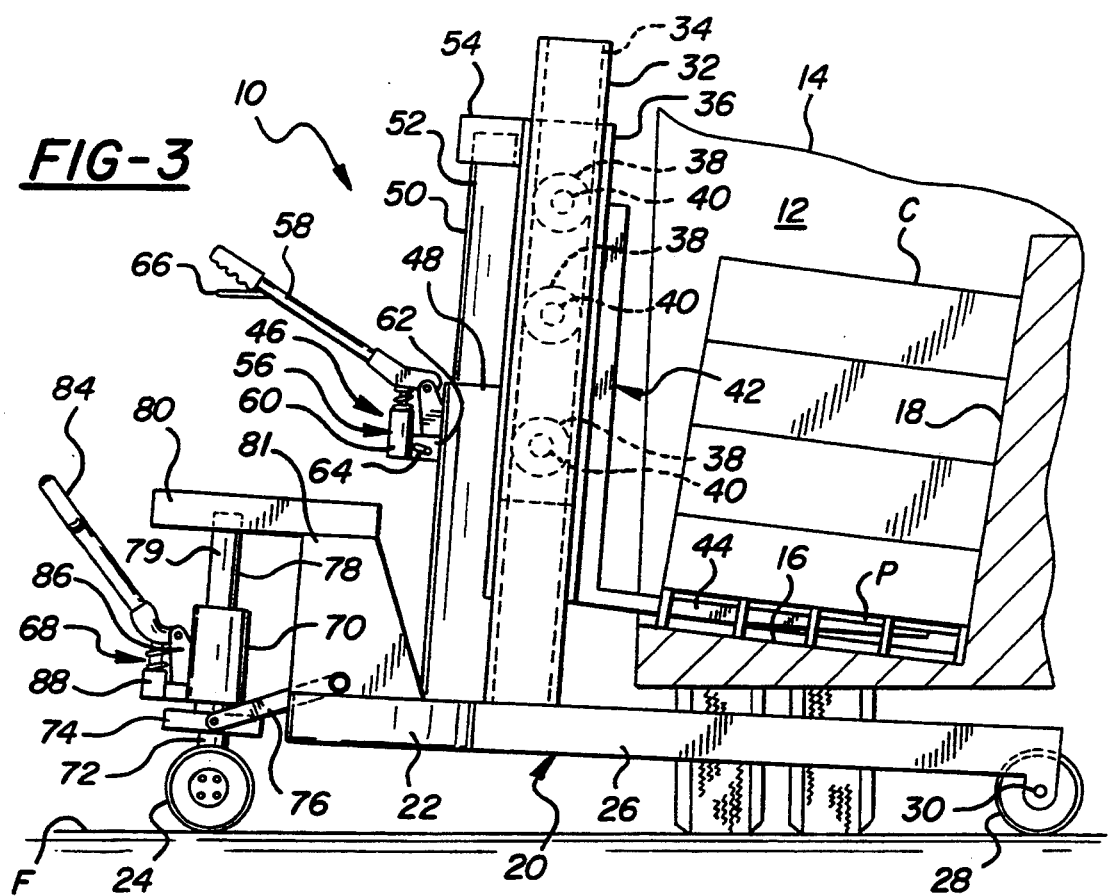
FIG. 3 is a side elevational view of the apparatus like FIG. 1, but showing the forks raised and tilted downwardly to the load receiving position and inserted into a pallet load of a side-loading beverage container truck.
Figure 4:
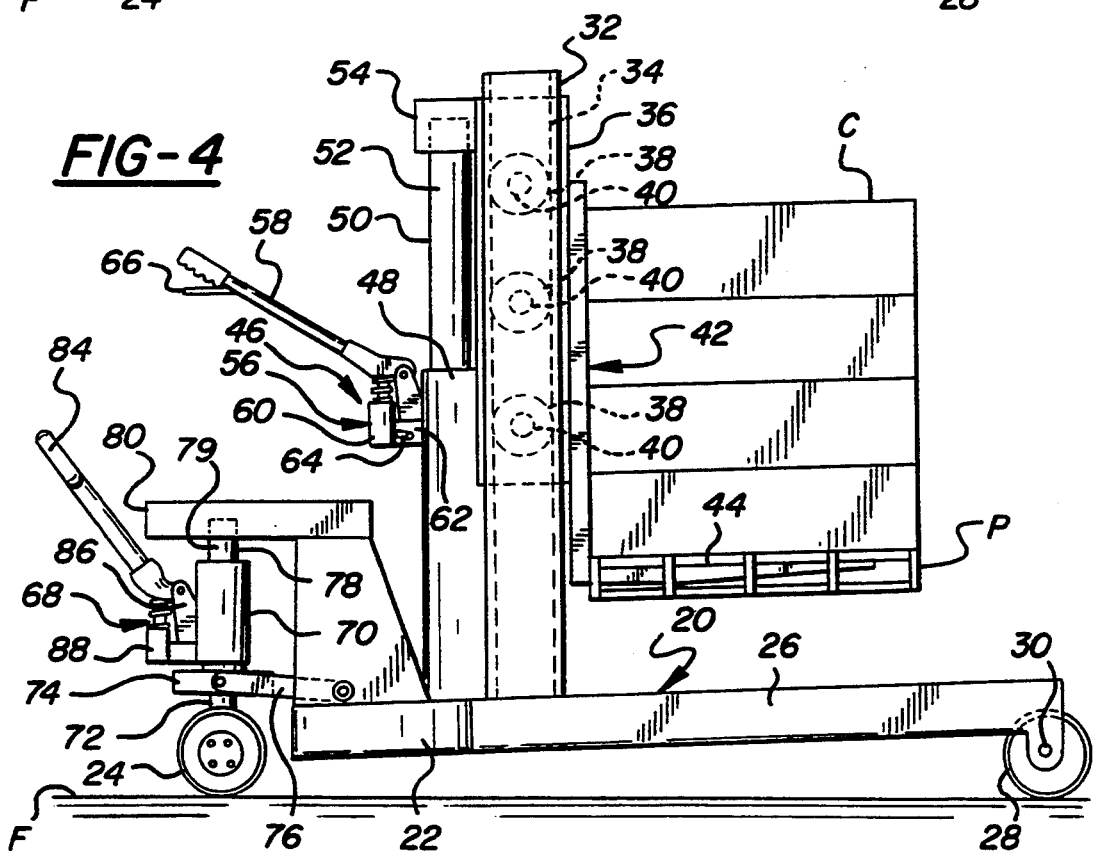
FIG. 4 is a side elevational view of the apparatus like FIG. 1, but with the forks elevated and supporting the pallet load.

A carriage lifting device 46 is provided for moving the carriage 36 and forks 42 as a unit along the mast 32 between a lowered position, illustrated in FIG. 1, and various raised positions, some of which are illustrated in FIGS. 3 through 5. The preferred carriage lifting device comprises a double acting hydraulic jack of conventional construction, having a fluid cylinder 48 secured to the base portion 22 of the frame 20 and an extending rod or shaft 50 having a piston portion thereof (not shown) accommodated within the cylinder 48 and an extendible portion 52 projecting out of the cylinder 48 and coupled to a rearwardly projecting lifting bracket 54 fixed to the backside of the carriage 36 between the guide rails 32. A conventional manually operable actuating device 56 is provided for operating the jack 46 to move the extending shaft 50, and hence the carriage 36 and forks 42 upwardly and downwardly on the mast 32. The device 56 includes a lever or handle 58 coupled pivotally to the body of the cylinder 48 to enable the handle to be rocked with up and down pumping action, for acting on a fluid delivery pump 60 coupled to the cylinder 48 via a switching valve mechanism 62 controlled by a selector lever 64 for introducing hydraulic fluid under pressure into the cylinder 48 either below or above the piston to either raise or lower the extending shaft 50 and hence the carriage and fork assembly. The handle 58 may be provided with a pressure release lever 66 or equivalent device which, when actuated, relieves the pressure from the cylinder 48 to restore the lifting device to the unactuated condition.

A fork tilting device 68 is also provided to selectively tilt the frame 20 and hence the fork tines 44 between an upwardly inclined load transporting position, illustrated in FIGS. 1 and 4, and a downwardly inclined load receiving position, illustrated in FIG. 3. The tilting device comprises a second hydraulic jack having a fluid cylinder 70 secured at its lower end to a vertical steering column 72 coupled to a transverse axle 73 mounting the rear wheels 24. The cylinder and steering column assembly is journalled by a yoke 74 pivoted to the base portion 22 of the frame 20 by linkage members 76. An extending rod or shaft 78 has a piston portion (not shown) accommodated within the cylinder 70 and an extendible portion 79 projecting out of the cylinder 70 and coupled to a rearwardly projecting elevated lifting platform 80 fixed to the base portion 22 by laterally spaced uprights 81. A conventional manually operable actuating device is provided for operating the jack 68 and comprises a lever or handle 84 coupled pivotally to the cylinder 70 by mounting brackets 86 to enable up and down rocking movements of the handle 84 for acting on a fluid delivery pump 88 coupled to the cylinder 70 for selectively introducing fluid under pressure into the cylinder 70 to extend the shaft 78 and hence back of the frame upwardly relative to the front end to tilt the fork tines 44. The handle 84 further enables the user to steer the rear wheels 24 by moving the handle 84 from side to side to thereby rotate the cylinder 70 and steering column 72 in yoke 74 to turn the rear wheels 24. The handle 84 may have a pressure relief lever 90 or other suitable device for operating a relief valve (not shown) to selectively relieve the pressure in the cylinder 70 to restore the frame 20 to the lowered position.

In operation, the lifting jack 46 is operated to lift the fork tines 44 to the level of the pallet load in the truck 14 and the tilting jack 68 is operated to lift the back end of the frame 20 relative to the front sufficiently to tilt the fork tines 44 downwardly from horizontal to the load receiving position of FIG. 3, corresponding in angularity to the inclination of the bay well floor 16. With the bay well 12 of the truck 14 opened, the hand truck is moved toward the side of the truck, with the leg portions 26 of the frame 20 proceeding under the truck 14, to extend the downwardly tilted fork tines 44 into the pallet, as shown in FIG. 3. The lifting jack 46 is then operated to further lift the forks 42, and thereby the pallet P and the stack of containers C, sufficiently so that the weight of the pallet load is fully supported by the apparatus 10 above the bay well floor 16. At this point, the fluid pressure in the tilting lifting cylinder 70 is relieved to thereby restore the frame 20 and forks 42 to the rearwardly inclined load transporting position, and the apparatus 10 is pulled rearwardly to withdraw the pallet P and its freight C from the bay well 12, as illustrated in FIG. 4.

The hand truck 10 can then be used to move the pallet load C to the desired location for storage or deposit and the pressure in the lifting jack cylinder 48 relieved to lower the forks 42 and set the pallet P and containers C on the ground or other suitable support surface. The hand truck may then be moved rearwardly away from the pallet P until the fork tines 44 are withdrawn from the pallet, in the usual manner. The hand truck 10 may then be moved back to the beverage truck 14 to unload the next bay or to be stowed, as will be explained below.

FIGS. 5 and 6 illustrate the manner by which the apparatus 10 may be stowed and carried by the truck 14 when not in use. As shown in FIG. 5, a pair of stirrups or hangers 92 may be mounted on the undercarriage of the truck 14 adjacent the back end of the truck of suitable size and spacing for insertably accommodating the fork tines 44. To stow the apparatus 10, the lifting jack 46 is operated to raise the forks 42 to the level of the hangers 92, and the apparatus 10 moved forwardly to insert the tines 44 into the hanger brackets 92, as illustrated in FIG. 5. The selector valve 62 may then be positioned (e.g., the selector lever 64 pivoted downwardly as in FIG. 6) to reverse the fluid flow into the cylinder 48, and the lifting jack 46 thereafter operated to lift the frame 20 toward the forks and into engagement with the undercarriage of the truck 14 and secured in that position for transport by the truck to another location. To unload the apparatus 10, the pressure in cylinder 48 may be relieved to enable the frame 20 to be lowered to the ground, after which the forks 42 may be withdrawn from the hanger brackets 92 by moving the apparatus 10 rearwardly.

It is to be understood that the embodiments described are exemplary of various forms of the invention only and that the invention is defined in the appended claims which contemplate various modifications within the spirit and scope of the invention.

I claim:

1. A method of unloading a pallet load supported at an angle within a bay well of a side-loading beverage delivery truck on an elevated floor inclined inwardly and downwardly toward the center of the truck, utilizing a forklift device comprising a wheeled frame and a rigid upstanding mast mounted on said frame and movably supporting a lifting carriage on which a pair of lifting forks are mounted having forwardly projecting tines adapted to engage and support the pallet load, said method comprising the steps of:

raising the carriage and fork assembly to the level of the pallet load;

elevating the back end of the frame relative to the front to thereby tilt said fork tines from an initial load transporting position downwardly from horizontal to a load receiving position corresponding in angularity to that of the bay well floor;

moving the wheeled frame toward the truck and inserting the downwardly angled fork tines into the pallet load;

further raising the carriage and fork assembly to lift and support the pallet load off the bay well floor;

lowering the back end of the frame to restore the fork tines to the load transporting position;

moving the wheeled frame away from the truck to withdraw the pallet load from the bay well; and lowering the carriage and fork assembly to deposit the pallet load on a support surface.

2. The method of claim 1 including orienting the back of the frame relative to the front when in the load transporting position such that the fork tines are angled upwardly from horizontal.

3. The method of claim 1 including stowing the apparatus after usage by: a) raising the carriage and fork assembly and inserting the tines of the forks into a pair of associated hangers secured to the underside of the beverage truck; and b) elevating the frame into engagement with the underside of the beverage truck to thereby suspend the apparatus from the truck.

4. A portable, manually-operable hand truck apparatus for unloading pallet loads supported at an inwardly and downwardly inclined predetermined angle within bay wells of a side-loading beverage delivery truck, said apparatus comprising:

a rigid support frame having a rear base portion and a pair of laterally spaced leg portions extending forwardly from said base for straddling the pallet;

support wheels mounted on said leg portions;

at least one steerable rear wheel mounted on said base portion;

an upright mast carried by said frame adjacent said base portion;

a lifting carriage mounted on said mast and movable therealong between raised and lowered positions;

a pair of lifting forks secured to said carriage having laterally spaced tines that project forwardly from said carriage at least in part coextensive with said leg portions of said frame for engaging and supporting a pallet load;

a carriage lifting device coupled to said lifting carriage to selectively move said carriage and said forks along said mast between said raised and lowered positions; and a fork tilting device carried by said frame for normally supporting said fork tines in a load transporting position and operative for selectively elevating and thus tilting said rear base portion of said frame in relation to said rear wheel to thereby tilt said fork tines downwardly from horizontal to a load receiving position corresponding in angularity to that of the bay well floor to enable the user to extend said fork tines into and engage the inwardly and downwardly inclined pallet load within the bay well for subsequent lifting and removal by said apparatus.

5. The apparatus of claim 4 wherein said fork tilting device comprises a hydraulic jack having a cylinder operatively coupled to said rear wheel and an extension shaft operatively coupled to said base portion and operative for selectively extending and retracting said shaft to raise and lower the back of said frame relative to the front to thereby move said fork tines between said load receiving and said load transporting positions.

6. The apparatus of claim 4 wherein said mast includes a pair of laterally spaced rails having wheel-receiving channels therein, and said lifting carriage includes a plurality of guide wheels mounted to opposite lateral sides of said carriage and accommodated within said channels for rollably guiding said carriage along said rails.

7. The apparatus of claim 6 wherein there are three of said guide wheels accommodated in each of said channels.

8. The apparatus of claim 4 wherein said carriage lifting device comprises a hydraulic jack having a fluid cylinder mounted to said frame and a piston coupled to said carriage and operative for selectively extending and retracting said piston to move said carriage and said forks between said raised and said lowered positions.

9. The apparatus of claim 8 wherein said hydraulic jack is double acting.

10. The apparatus of claim 4 wherein said fork tines are inclined upwardly from horizontal when in said load transporting position.

11. The apparatus of claim 4 wherein said leg portions of said frame straddle said fork tines.

* * * * *